(12) United States Patent
Rodriguez et al.

(10) Patent No.: US 7,388,683 B2
(45) Date of Patent: Jun. 17, 2008

(54) FAX CHECK/MONEY ORDER AUTOMATICALLY FROM ATM

(75) Inventors: Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 10/718,093

(22) Filed: Nov. 20, 2003

(65) Prior Publication Data

US 2005/0111048 A1 May 26, 2005

(51) Int. Cl.
*G06K 1/00* (2006.01)
*H04N 1/32* (2006.01)
*H04N 1/00* (2006.01)
*H04N 1/40* (2006.01)

(52) U.S. Cl. .............. 358/1.15; 358/442; 358/402; 358/443

(58) Field of Classification Search .............. 358/474, 358/1.15, 442, 402, 443; 235/379, 385; 705/43
See application file for complete search history.

(56) References Cited

U.S. PATENT DOCUMENTS

| 4,918,723 | A | * | 4/1990 | Iggulden et al. ........ 379/100.17 |
| 5,265,008 | A | | 11/1993 | Benton et al. ............... 364/408 |
| 5,594,225 | A | | 1/1997 | Botvin ....................... 235/379 |
| 6,028,679 | A | | 2/2000 | Murphy ..................... 358/407 |
| 2002/0023055 | A1 | * | 2/2002 | Antognini et al. ............. 705/40 |
| 2002/0024590 | A1 | * | 2/2002 | Pena ....................... 348/14.08 |
| 2004/0098740 | A1 | * | 5/2004 | Maritzen et al. .............. 725/27 |

* cited by examiner

*Primary Examiner*—Houshang Safaipour
(74) *Attorney, Agent, or Firm*—Duke W. Yee; Justin M. Dillon; Mari A. Stewart

(57) ABSTRACT

An automatic teller machine capable of sending a facsimile of a check, money order, or other payment instrument to a payee designated by a user. The user inserts cash or allows an account to be debited to pay for the payment instrument, and the automatic teller machine faxes the payment instrument to the payee.

21 Claims, 1 Drawing Sheet

FAX CHECK/MONEY ORDER AUTOMATICALLY FROM ATM

BACKGROUND OF THE INVENTION

1. Technical Field

The present invention relates generally to automatic teller machine (ATM) terminals, and particularly to a fax-capable ATM.

2. Description of Related Art

Today's financial institutions have readily adopted information processing systems (such as servers and personal computers) for storage, communication, and transactions in business. Such information processing systems, when combined with networks, allow faster and cheaper communication and transactions to be performed. Many of the computer systems in use today are designed to perform specific functions in the day-to-day operations of a financial institution.

ATMs are examples of how information processing systems and networks have been adopted into use by banking institutions. ATMs are stand alone machines that are capable of accepting user inputs and relaying information across networks and allow a user several transaction options, such as depositing money or withdrawing it.

However, ATMs have certain drawbacks. For example, a bank customer or user cannot use an ATM transaction to buy items or to pay merchants. Instead, an ATM user is limited to withdrawing cash from the ATM, and using cash in any transactions or purchases. There are many instances when withdrawing cash may not be desirable, or when cash may not be the best medium in which to pay a merchant.

SUMMARY OF THE INVENTION

In one example embodiment, the present invention describes an ATM that allows a user to specify a fax number during an ATM transaction, and which will fax a check or money order to the designated recipient. In a preferred embodiment, the user may also view and/or print the check or money order as proof of payment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
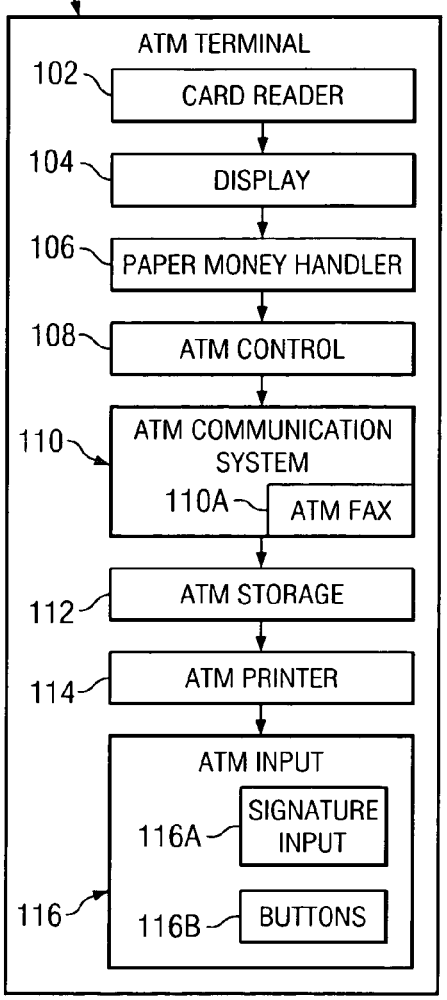
FIG. 1 shows a block diagram of a networked ATM, consistent with implementing a preferred embodiment of the present invention.

FIG. 1 shows an ATM (Automatic Teller Machine) consistent with implementing a preferred embodiment of the present invention. This example embodiment shows a representative ATM terminal 100 having several functions. For example, the innovative ATM includes a card reader 102, which accepts card input such as a magnetic stripe card. Display 104 provides output to a user, as does printer 114. Paper money handler 106 dispenses cash, and in some embodiments accepts input cash or envelopes. Also shown is ATM control 108 which preferably includes a control system for the various features of the ATM 100. ATM 100 also includes communication means 110, and preferably includes ATM fax 110A which is capable of sending a standard fax across phone lines, for example. Also included is ATM storage 112, which is preferably implemented as local computer storage. Output means also include ATM printer 114, while input means 116 preferably includes buttons 116B and an input 116A for receiving a signature from a user.

Figure 2:
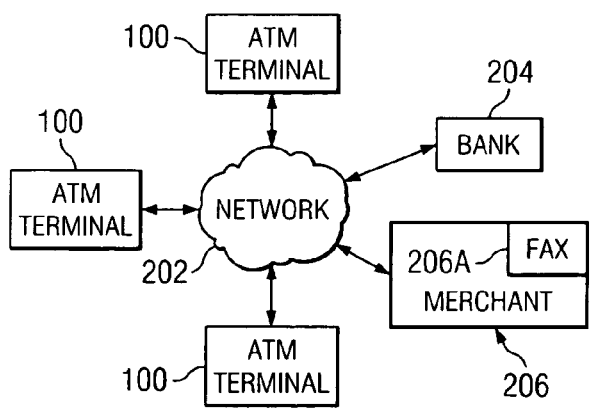
FIG. 2 shows a computer network, consistent with implementing a preferred embodiment of the present invention.

Innovative ATM 100 is preferably connected to a network which allows it to communicate with other computer systems, such as a bank or other systems connected to the network. FIG. 2 shows an example network setup consistent with implementing a preferred embodiment of the present invention.

FIG. 2 shows a network 202 which connects various ATM terminals 100 to bank 204. Network 202 can comprise the Internet, or a local area network (LAN), or another network configuration that allows remote communication between ATMs 100 and other non-local entities, such as bank 204. In a preferred embodiment, network 202 also allows communication to merchant 206, who participates in the transactions using the present invention, as described below. Merchant 206 can connect to the network using a telephone line, for example, using a facsimile machine 206A.

The present invention allows a user to use an ATM to send a facsimile of a check or money order to a designated recipient. The user can also opt to have the check or money order printed out instead of or in addition to the fax. When a user presents cash, a credit, debit, or other type of cash or credit card to an ATM, the terminal presents the user with an option for creating a fax and sending a check or money order (or other financial payment instrument, including but not limited to a cashier's check, a negotiable instrument, bearer paper, or other instrument) to a designated recipient. Though several types of payment are described herein (such as check or money order), all these terms will be referred to herein as a "payment instrument." This term is not intended to limit the invention to a specific type of instrument (such as a cashier's check), but is intended to represent any of the various types of payment instruments that currently exist or which may be created in the future. It should be noted that the faxed documents are intended to be as binding as originals where allowed by current or future laws governing such instruments.

Figure 3:
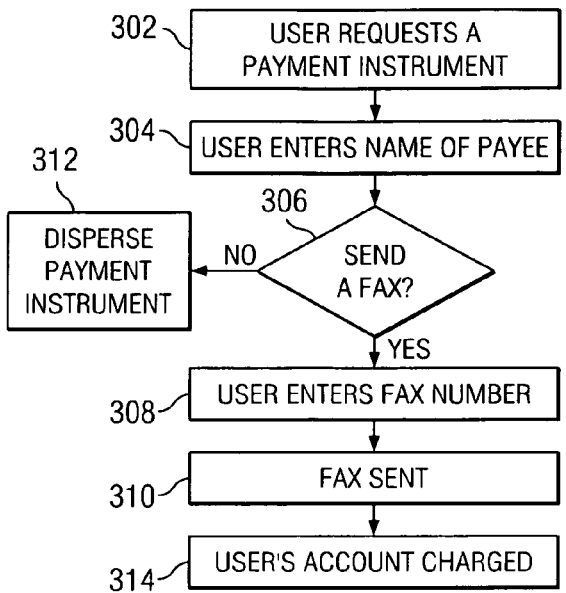
FIG. 3 shows a flowchart for process steps consistent with implementing a preferred embodiment of the present invention.

FIG. 3 shows a flowchart of process steps for implementing a preferred embodiment of the present invention. First, a user presents cash or a card to the ATM and requests a bank check or money order, or other payment instrument (step 302). If the user has a bank account, then the user may also request a personal check. Next, the user enters the name of the payee for the payment instrument (step 304). The user then chooses whether to fax the payment instrument (step 306). If the user does want a fax, the user is prompted to enter the fax number (step 308) (or a fax number is retrieved from memory) and the payment instrument is faxed (step 310). This step is preferably performed by ATM fax 110A of FIG. 1. If the user does not want to send a fax, the payment instrument is dispensed to the user (step 312). The user's account or card is then charged for the amount of the payment instrument and any accompanying service fee, if necessary (step 314). In preferred embodiments, the user of the service can later view or print the payment instrument as proof of payment. In a preferred embodiment, the user can return later to any ATM and get a copy of a receipt, cancelled check or money order (or other appropriate payment instrument) as proof of the transaction. For example, a transaction code can be attached to the transaction, which a user can use to check on the status of the transaction or payment.

In some embodiments, ATM 100 is equipped with capabilities to receive a user's signature, such as through a touch sensitive screen and a stylus. In this way, the user can physically attach a signature to the payment instrument, if necessary. Such signature receiving capability is preferably provided, for example, by signature input 116A of FIG. 1.

Figure 4:
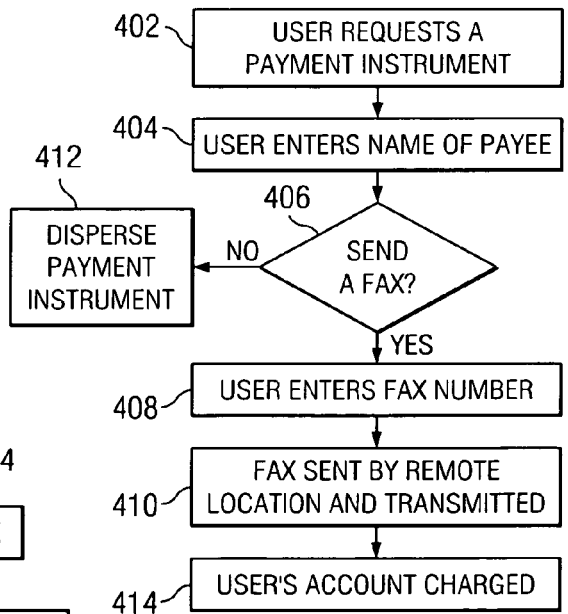
FIG. 4 shows a flowchart for process steps consistent with implementing a preferred embodiment of the present invention.

In alternate embodiments, ATM 100 does not itself accomplish the fax. For example, legacy ATMs not equipped with a fax capability may not be capable of sending a fax. However, even ATMs not equipped with fax capability can still cause the sending of a fax. For example, the ATM may receive the user's request for a faxed payment instrument, and forward that request via a network connection to a machine that is fax capable. FIG. 4 shows such a situation.

First, a user presents cash or a card to the ATM and requests a bank check or money order, or other payment instrument (step 402). (Note that the type of cash card can vary within the context of the present invention without deviating from the innovations of the present invention—for example, the card may be a smartcard, BlueTooth, WiFi, or other types of cards, whether wireless or magnetic stripe or other types currently existing or to be created in the future.) If the user has a bank account, then the user may also request a personal check. Next, the user enters the name of the payee for the payment instrument (step 404). The user then chooses whether to fax the payment instrument (step 406). If the user does want a fax, the user is prompted to enter the fax number (step 408). Because the ATM in this example does not have fax capability, the request to send a fax is sent via a network connection 202 using the ATM communication system 110 to a computer system or fax machine at a location remote to ATM 100. The remote machine then causes the fax to be transmitted, using information gathered from the user at the ATM 100 (step 410). If the user does not want to send a fax, the payment instrument is dispensed to the user (step 412). The user's account or card is then charged for the amount of the payment instrument and any accompanying service fee, if necessary (step 414).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An automatic teller machine, comprising:
   a first input receiver in the automatic teller machine, wherein the first input receiver receives input from a user, wherein the first input receiver receives the input selected from a group consisting of: a magnetic strip card of the user, a wireless communication capable card, and cash;
   a second input receiver in the automatic teller machine, wherein the second input receiver receives input from the user to form a request to fax a payment instrument;
   a communication system capable of sending a facsimile to a first remote location, wherein the user designates a facsimile number and causes the payment instrument to be sent by facsimile to the first remote location; and
   a network connection, wherein the automatic teller machine forwards the request to fax the payment instrument to a second remote location via the network connection when the automatic teller machine is incapable of sending the facsimile, wherein a machine that is fax capable at the second remote location causes the facsimile to be transmitted to the first remote location.

2. The machine of claim 1, wherein the second input receiver comprises an alpha-numeric keypad.

3. The machine of claim 1, wherein the payment instrument is selected from the group consisting of: a personal check, a cashier's check, and a money order.

4. The machine of claim 1, wherein the first remote location is a payee.

5. The machine of claim 1, wherein an account of the user is charged for the payment instrument.

6. The machine of claim 1, wherein the user can obtain a receipt of the payment instrument from any automatic teller machine.

7. The machine of claim 1, wherein a receipt of the payment instrument is printed.

8. A method of making a payment, comprising the steps of:
   requesting a payment instrument to be created by an automatic teller machine, wherein the automatic teller machine receives input for creating the payment instrument from a group consisting of a magnetic strip card, a wireless communication capable card, and cash;
   designating a payee for the payment instrument;
   designating a facsimile number to form a request for a facsimile;
   sending the payment instrument, by the automatic teller machine, to the payee via facsimile, wherein the facsimile is sent from the automatic teller machine located at a first location to the payee located at a second remote location; and
   responsive to the automatic teller machine being incapable of sending the facsimile, forwarding the request for the facsimile, by the automatic teller machine, via a network connection to a machine at a third remote location that is fax capable, wherein the machine at the third remote location causes the facsimile to be transmitted.

9. The method of claim 8, further comprising the step of charging a user account for the payment instrument.

10. The method of claim 8, wherein a user pays for the payment instrument using a means selected from the group consisting of: cash, a cash card, a credit card, or a banking account.

11. The method of claim 8, wherein the payment instrument is selected from the group consisting of: a personal check, a cashier's check, and a money order.

12. The method of claim 8, wherein the user can obtain a receipt of the payment instrument from any automatic teller machine.

13. The method of claim 8, further comprising the step of printing a receipt of the payment instrument.

14. A business method, comprising the steps of:
   receiving a request from a user at an automatic teller machine to send a facsimile of a payment instrument from the automatic teller machine located at a first location to a designated payee at a second location, wherein the second location is remote from the first location;
   sending the facsimile of the payment instrument to the designated payee;

responsive to the automatic teller machine being incapable of sending the facsimile, forwarding the request to send the facsimile of the payment instrument to a machine at a third remote location that is fax capable, wherein the machine at the third remote location causes the facsimile to be transmitted; and receiving payment for the payment instrument, wherein an account of the user is charged for the payment instrument to form the payment, and wherein the user can obtain a receipt of the payment instrument from any automatic teller machine.

15. The method of claim 14, wherein the step of receiving payment for the payment instrument comprises debiting an account of the user.

16. The method of claim 14, wherein the step of receiving payment for the payment instrument comprises receiving cash input by the user into the automatic teller machine.

17. The method of claim 14, further comprising:
presenting to the user at least one of a payment instrument and a proof of the transaction.

18. The method of claim 14, wherein the step of sending the facsimile further comprises receiving a designation of a facsimile number from the user.

19. The method of claim 14, wherein the payment instrument is selected from the group consisting of: a cashier's check, a money order and a personal check.

20. The method of claim 14, further comprising the step of printing a receipt of the payment instrument.

21. An automatic teller machine, comprising:
a first input receiver for receiving input from a user, wherein the first input receiver receives input for a transaction selected from the group consisting of a magnetic strip card, a wireless communication capable card, and cash;

a second input receiver for receiving input from the user, wherein the second input receiver comprises an alphanumeric keypad and wherein a user designates a facsimile number and causes a payment instrument to be sent in a facsimile to a first remote location;

a communication system capable of sending the facsimile to the first remote location;

a sending means for forwarding a facsimile request to send the facsimile from a second remote location when the automatic teller machine is incapable of sending the facsimile, wherein the facsimile request to send the facsimile is sent from the automatic teller machine to a remote machine at the second remote location, and wherein the remote machine causes the facsimile to be sent;

a charging means, responsive to the sending of the facsimile, for charging a user account for the payment instrument; and an output means for presenting to the user at least one of a payment instrument and a proof of the transaction.

* * * * *